(12) United States Patent
Oh et al.

(10) Patent No.: US 11,176,328 B2
(45) Date of Patent: Nov. 16, 2021

(54) NON-FACTOID QUESTION-ANSWERING DEVICE

(71) Applicant: National Institute of Information and Communications Technology, Tokyo (JP)

(72) Inventors: Jonghoon Oh, Tokyo (JP); Kentaro Torisawa, Tokyo (JP); Canasai Kruengkrai, Tokyo (JP); Ryu Iida, Tokyo (JP); Julien Kloetzer, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 193 days.

(21) Appl. No.: 16/629,293

(22) PCT Filed: Jun. 14, 2018

(86) PCT No.: PCT/JP2018/022696
§ 371 (c)(1),
(2) Date: Jan. 7, 2020

(87) PCT Pub. No.: WO2019/012908
PCT Pub. Date: Jan. 17, 2019

(65) Prior Publication Data
US 2020/0134263 A1    Apr. 30, 2020

(30) Foreign Application Priority Data

Jul. 13, 2017   (JP) .............................. JP2017-137023

(51) Int. Cl.
*G06F 17/00* (2019.01)
*G06F 40/30* (2020.01)
(Continued)

(52) U.S. Cl.
CPC .......... *G06F 40/30* (2020.01); *G06F 16/3329* (2019.01); *G06F 16/3347* (2019.01); *G06N 3/08* (2013.01)

(58) Field of Classification Search
None
See application file for complete search history.

(56) References Cited

U.S. PATENT DOCUMENTS

| 2015/0026106 | A1* | 1/2015 | Oh | ...................... | G06F 16/3329 706/12 |
| 2016/0155058 | A1* | 6/2016 | Oh | ........................ | G06N 5/041 706/11 |

(Continued)

FOREIGN PATENT DOCUMENTS

| JP | 2013-171550 A | 9/2013 |
| JP | 2015-011426 A | 1/2015 |

(Continued)

OTHER PUBLICATIONS

International Search Report for corresponding Application No. PCT/JP2018/022696, dated Sep. 4, 2018.

(Continued)

*Primary Examiner* — Satwant K Singh
(74) *Attorney, Agent, or Firm* — Renner, Otto, Boisselle & Sklar, LLP

(57) ABSTRACT

A question answering device includes: a general word vector converter converting a question and an answer to semantic vectors in accordance with general context; a general sentence level CNN 214, in response to similarities of semantic vectors between words in question and answer and to strength of causality between the words, for weighting each semantic vector to calculate sentence level representations of the question and the answer; a general passage level CNN 218, in response to similarity between sentence level representations of question and answer, and to strength of (Continued)

```
┌─────────────────────────30
│ 質問：なぜ津波が発生する？ │
└─────────────────────────┘
(QUESTION: WHY DOES A TSUNAMI OCCUR?)
                                  ┌32
┌────────────────────────────────┐
│ 回答：地震が海底で起きた場合、海水面が │
│   盛り上がり、一気に崩れていきます。   │
│                                │
│   これが原因で津波が発生します。     │
└────────────────────────────────┘
(ANSWER: WHEN AN EARTHQUAKE OCCURS AT THE SEA BOTTOM,
  SEA SURFACE RISES AND COLLAPSES AT A STRETCH

THIS IS THE CAUSE OF A TSUNAMI OCCURRENCE)
``` relation of vectors in the sentence level representations viewed from causality, for weighting the sentence level representation to calculate a passage level representation for the question and answer passage; and a classifier determining whether or not an answer is a correct answer, based on the similarities between outputs from CNNs 214 and 218.

6 Claims, 16 Drawing Sheets

(51) Int. Cl.
  *G06F 16/33*  (2019.01)
  *G06F 16/332*  (2019.01)
  *G06N 3/08*  (2006.01)

(56) References Cited

U.S. PATENT DOCUMENTS

2018/0246953 A1* 8/2018 Oh .................... G06N 5/003
2018/0341871 A1* 11/2018 Maitra ............... G06N 3/0427

FOREIGN PATENT DOCUMENTS

JP  2017-049681 A  3/2017
JP  2018-063696 A  4/2018

OTHER PUBLICATIONS

S. Verbeme et al., "What is not in the bag of words for why-qa?", Computational Linguistics, 36:229-245, 2010; discussed in Specification.

Jong-Hoon Oh et al., "Why Question Answering using Sentiment Analysis and Word Classes", In Proceedings of EMNLP-CoNLL 2012, pp. 368-378; discussed in Specification.

Jong-Hoon Oh et al., "Why-Question Answering using Intra- and Inter-Sentential Causal Relations", In Proceedings of the 51st Annual Meeting of the Association for Computational Linguistics (ACL 2013), pp. 1 733-1743, Sofia, Bulgaria, Aug. 2013; discussed in Specification.

Jong-Hoon Oh et al., "Multi-column Convolutional Neural Networks with Causality-Attention for Why-Question Answering." In the Proceedings of the tenth ACM International Conference on Web Search and Data Mining (WSDM2017) Cambridge, UK, Feb. 2017; discussed in Specification.

Jong-Hoon Oh et al., "A Semi-Supervised Learning Approach to Why-Question Answering", In the Proceedings of the 30th AAAI Conference on Artificial Intelligence (AAAI-16), Phoenix, USA, Feb. 2016; discussed in Specification.

\* cited by examiner

(QUESTION: WHY DOES A TSUNAMI OCCUR?)

32
回答：地震が海底で起きた場合、海水面が盛り上がり、一気に崩れていきます。

これが原因で津波が発生します。

(ANSWER: WHEN AN EARTHQUAKE OCCURS AT THE SEA BOTTOM, SEA SURFACE RISES AND COLLAPSES AT A STRETCH

THIS IS THE CAUSE OF A TSUNAMI OCCURRENCE)

(QUESTION: WHY DOES A TSUNAMI OCCUR?)

回答：地震が海底で起きた場合、海水面が　～32
　　　盛り上がり、一気に崩れていきます。

これが原因で津波が発生します。
　　　　　　　　　　　　　　　～40

(ANSWER: WHEN AN EARTHQUAKE OCCURS AT THE SEA BOTTOM,
SEA SURFACE RISES AND COLLAPSES AT A STRETCH

THIS IS THE CAUSE OF A TSUNAMI OCCURRENCE)
　　　　　　　　　　　　～40

(QUESTION: WHY DOES A TSUNAMI OCCUR?)

回答：地震が海底で起きた場合、海水面が盛り上がり、一気に崩れていきます。 ─42 ─32

これが原因で津波が発生します。

(ANSWER: WHEN AN EARTHQUAKE OCCURS AT THE SEA BOTTOM, SEA SURFACE RISES AND COLLAPSES AT A STRETCH ─42

THIS IS THE CAUSE OF A TSUNAMI OCCURRENCE)

Fig. 4

質問：なぜ津波が発生する？ ⌐30
(QUESTION: WHY DOES A TSUNAMI OCCUR?)

回答：地震が海底で起きた場合、海水面が ⌐32
盛り上がり、一気に崩れていきます。
これが原因で津波が発生します。
44

(ANSWER: WHEN AN EARTHQUAKE OCCURS AT THE SEA BOTTOM,
SEA SURFACE RISES AND COLLAPSES AT A STRETCH

THIS IS THE CAUSE OF A TSUNAMI OCCURRENCE)
44

Fig. 5

質問：なぜ津波が発生する？
(QUESTION: WHY DOES A TSUNAMI OCCUR?)

回答：地震が海底で起きた場合、海水面が盛り上がり、一気に崩れていきます。これが原因で津波が発生します。

(ANSWER: WHEN AN EARTHQUAKE OCCURS AT THE SEA BOTTOM, SEA SURFACE RISES AND COLLAPSES AT A STRETCH THIS IS THE CAUSE OF A TSUNAMI OCCURRENCE)

Fig. 6

地震
(EARTHQUAKE)

(RISES)
盛り上がる

隆起　沈降
(RISE) (SUBSIDE)

火山
(VOLCANO)

崩れる
(COLLAPSE)

(SEA BOTTOM)
海底

津波
(TSUNAMI)

海水面
(SEA SURFACE)

(VOLCANO)　　　(RISES)
　　(SEA BOTTOM) (RISE)
(EARTHQUAKE)
　　　(SEA SURFACE)(SUBSIDE)
　　　　　　　(COLLAPSE)

津波
(TSUNAMI)

Fig. 14

|  | P@1 | MAP | RP@1 | RMAP |
|---|---|---|---|---|
| OH13 | 41.8 | 41.0 | 69.2 | 67.9 |
| OH17 | 47.6 | 45.0 | 78.8 | 74.5 |
| BASESA | 40.4 | 37.4 | 66.9 | 62.0 |
| BASECA | 47.2 | 45.2 | 78.1 | 74.8 |
| BASEDA | 48.4 | 46.4 | 80.1 | 76.7 |
| EMBODIMENT (1 LAYER) | 50.6 | 47.7 | 83.8 | 79.0 |
| EMBODIMENT (2 LAYERS) | 51.6 | 48.3 | 85.4 | 80.0 |
| EMBODIMENT (3 LAYERS) | 49.6 | 47.0 | 82.1 | 77.8 |
| ORACLE | 60.4 | 60.4 | 100 | 100 |

NON-FACTOID QUESTION-ANSWERING DEVICE

TECHNICAL FIELD

The present invention relates to a question-answering device and, more specifically, to an improvement of a question-answering system handling non-factoid questions involving reasons, methods and definitions, rather than the factoid questions that can be answered by simple words.

BACKGROUND ART

Why-questions are typical non-factoid questions. In a why question-answering task, the most important semantic knowledge is believed to be the causality. The why question-answering task is to search a text archive of vast amount of texts and retrieve the answers to a question such as "Why does a tsunami occur?" While the why question-answering task is very important in Artificial Intelligence (AI), natural language processing, information retrieval, web mining, data mining and other fields, it has been recognized as a very challenging technical task.

Prior art techniques for the why question-answering task include the use of a classifier trained through supervised learning (see, e. g. Non-Patent Literature 2, 3 and 4) or semi-supervised learning (see, e.g. Non-patent Literature 5) using lexical features (word sequences, morpheme sequences), structural features (partial tree structure and the like; e.g. Non-Patent Literature 1), semantic features (word meanings, sentiment expression, causality, etc.) of texts, to specify an answer to a why-type question.

These approaches all use classifiers trained through the machine learning. Of these classifiers, those classifiers other than the neural networks, trained by the machine learning such as a SVM (Support Vector Machine) give low performance. Approaches using the neural networks have improved the accuracy as compared with those using SVMs or the like, but their performance is still not sufficiently high.

CITATION LIST

Non Patent Literature

NPL 1: Suzan Verberne, Lou Boves, Nelleke Oostdijk, and Peter-Arno Coppen. What is not in the bag of words for why-qa? Computational Linguistics, 36:229-245, 2010.

NPL2: Jong-Hoon Oh, Kentaro Torisawa, Chikara Hashimoto, Takuya Kawada, Stijn De Saeger, Junichi Kazama and Yiou Wang. Why Question Answering Using Sentiment Analysis and Word Classes, In Proceedings of EMNLP-CoNLL, 2012, pp. 368-378.

NPL3: Jong-Hoon Oh, Kentaro Torisawa, Chikara Hashimoto, Motoki Sano, Stijn De Saeger, and Kiyonori Ohtake. Why-question answering using intra- and inter-sentential causal relations. In Proceedings of the 51st Annual Meeting of the Association for Computational Linguistics (ACL 2013), pp. 1733-1743, Sofia, Bulgaria, August, 2013.

NPL4: Jong-Hoon Oh, Kentaro Torisawa, Canasai Kruengkrai, Ryu Iida and Julien Kloetzer. Multi-column Convolutional Neural Networks with Causality-Attention for Why-Question Answering. In the Proceedings of the tenth ACM International conference on Web Search and Data Mining (WSDM2017), Cambridge, U.K., February, 2017.

NPL5: Jong-Hoon Oh, Kentaro Torisawa, Chikara Hashimoto, Ryu Iida, Masahiro Tanaka and Julien Kloetzer. A Semi-Supervised Learning Approach to Why-Question Answering. In the Proceedings of the 30th AAAI Conference on Artificial Intelligence (AAAI-16), Phoenix, USA, February 2016.

SUMMARY OF INVENTION

Technical Problem

The low accuracy of answers to why-type questions is due to the insufficient consideration of the relevance of the correct answers to a question in the prior techniques. Correct answers to a question must satisfy the following conditions: (1) the answer is relevant to the topic of the question; (2) the answer presents the reasons or causes that the question asks; and (3) the answer presents the causality between the expressions representing the above (1) and (2) in the discourse structure of the answer texts. The prior art techniques paid attention only to a part of these conditions and none has considered each of these three aspects. This leads to the difficulty of retrieving correct answers with high accuracy by conventional techniques.

Such a difficulty also arises in tasks other than causality-based why-question. Basic relations underlying the non-factoid questions include: the material relations (an example: <produce B from A> (corn, biofuel); the necessity relations (an example: <A is indispensable for B> (sunlight, photosynthesis); the use relations (an example: <use A for B> (iPS cells, regenerative medicine); and the prevention relations (an example: <prevent B by A> (vaccine, influenza). When retrieving answers to the questions involving these relations, as in the case of causality, those expressions must be retrieved that satisfy the following three conditions: (1) the answer is relevant to the topic of the question; (2) the answer presents what the question asks (the material in the material relations, the necessary object in the necessity relations, the object to be used in the use relations, the object to be used for prevention in the prevention relations); and (3) the answer presents the corresponding relation between the expressions (1) and (2) in the discourse structure of the answer texts.

Therefore, an object of the present invention is to provide a non-factoid question-answering device that can provide a highly accurate and correct answer to a non-factoid question by retrieving the answer candidates through sufficient consideration of the conditions of the correct answers to a question.

Solution to Problem

According to a first aspect, the present invention provides a non-factoid question-answering device that receives a pair of a question and an answer passage and determines whether or not the answer passage is a correct answer to the question. The non-factoid question-answering device includes: a first word semantic vector converting means for converting the question and the answer passage to word semantic vector sequences in accordance with meanings from a certain viewpoint; and a first sentence level representation output means for weighting each word semantic vector to calculate and output sentence level representations of the question and the answer passage, in response to similarities of the word semantic vectors between words in the question sentence and in the answer passage converted by the first word semantic vector converting means, and in response to a coefficient reflecting strength of a first prescribed relation between words. The non-factoid question-answering device further includes a first passage level representation output means for calculating and outputting a passage level representation for each of the question and the answer passage, by executing for a prescribed number of times weighting of the sentence level representation, in response to similarity between the sentence level representation of the question and the sentence level representation of the answer passage output by the first sentence level representation output means, and in response to a coefficient reflecting strength of relation of vectors in the sentence level representations viewed in a context of the first prescribed relation; and a determining means for determining whether or not the answer passage is a correct answer to the question, based on the similarity between the sentence level representations for each of the question and the answer passage output from the first sentence level representation output means, and based on the similarity between the passage level representations for each of the question and the answer passage output from the first passage level representation output means.

Preferably, the first sentence level representation output means includes: a similarity attention matrix calculating means for calculating, for combinations of each of the word semantic vectors contained in the word semantic vector sequence of the question sentence and each of the word semantic vectors contained in the word semantic vector sequence of the answer passage, similarity representing semantic similarity between each other, and for calculating a similarity attention matrix; and a first attention matrix calculating means for calculating, for the combinations of each of the words contained in the question sentence and each of the words contained in the answer passage, a measure representing frequency that the two words respectively appear at prescribed positions in a sentence in accordance with the first prescribed relation, and for calculating an attention matrix related to the first prescribed relation. The first sentence level representation means further includes a word vector calculating means for performing, on the word semantic vector sequences contained in the word semantic word vector sequences of the question sentence and the word semantic vector sequences of the answer passage, an operation of adding weight of the similarity attention determined by the similarity attention matrix and the first attention determined by the first attention matrix and thereby for calculating each word vector; and a convolutional neural network (CNN) for performing sentence-by-sentence convolution and pooling on both of the word semantic sequence of the question sentence and the word semantic vector sequence of the answer passage calculated by the word vector calculating means, and thereby for outputting the first sentence level representation.

More preferably, the non-factoid question-answering device includes a sparse processing means for making sparse each word vector by updating any negative element of each word vector to zero prior to calculation of each word vector by the word vector calculating means.

More preferably, the non-factoid question-answering device may further include a second word semantic vector converting means for converting the question and the answer passage to word semantic vector sequences respectively in accordance with meanings from another viewpoint different from the certain viewpoint; and a second sentence level representation output means for weighting each word semantic vector to calculate and output sentence level representations of the question and the answer passage, in response to similarities of word semantic vectors between words in the question sentence and in the answer passage converted by the second word semantic vector converting means, and in response to a coefficient reflecting strength of a second prescribed relation between words. The non-factoid question-answering device further includes a second passage level representation output means for calculating and outputting a passage level representation for each of the question and the answer passage, by executing for a prescribed number of times weighting of the sentence level representation, in response to similarity between the sentence level representation of the question and the sentence level representation of the answer passage output by the second sentence level representation output means, and in response to a coefficient reflecting strength of relation of vectors in the sentence level representations viewed in a context of the second prescribed relation. The determining means includes means for determining whether or not the answer passage is a correct answer to the question, based on the similarity between the sentence level representations for each of the question and the answer passage output from the first and second sentence level representation output means, and based on the similarity between the passage level representations for each of the question and the answer passage output from the first and second passage level representation output means.

Preferably, the second prescribed relation is the same as the first prescribed relation, which is, for example, causality.

BRIEF DESCRIPTION OF DRAWINGS

FIG. 1 shows a why-question and its answer candidate.

FIG. 2 shows an example of a topic presented to the why-question.

FIG. 3 shows an example of a cause presented to the why-question.

FIG. 4 shows an example of causality between the topic and the cause presented to the why-question.

FIG. 5 shows focusing on the words from the viewpoint of the causality context.

FIG. 6 shows an example of words mapped on a word vector space from the viewpoint of the general context.

FIG. 7 shows an example of the words mapped on a word vector space from the viewpoint of the causality context.

FIG. 14 shows, in the form of a table, results of experiments showing the effectiveness of the why-question-answering system in accordance with the first embodiment of the present invention.

DESCRIPTION OF EMBODIMENTS

Figure 8:
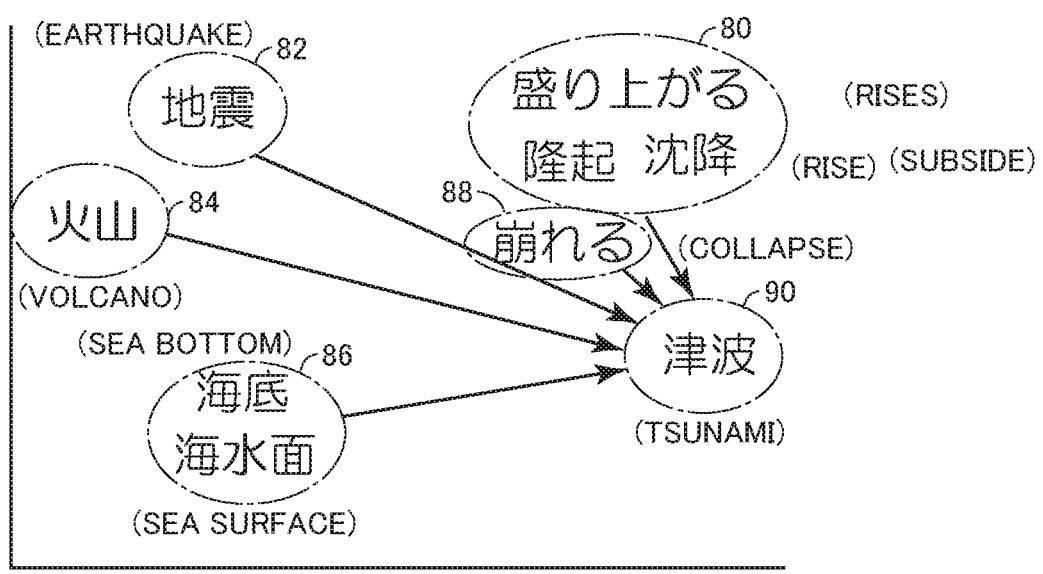
FIG. 8 shows the relations of the word vectors between the cause and the result in the general context.

In the following description and in the drawings, the same components are denoted by the same reference characters. Therefore, detailed description thereof will not be repeated. While causality is discussed as an example of a first semantic relation expression in the embodiments below, the present invention is not limited to such embodiments. As described above, the relations such as the material relations (an example: <produce B from A> (corn, biofuel), the necessity relations (an example: <A is indispensable for B> (sunlight, photosynthesis), the use relations (an example: <use A for B> (iPS cells, regenerative medicine) and the prevention relations (an example: <prevent B by A> (vaccine, influenza), or any combination of thereof may be used.

[Basic Concept]

Answers to a why-question must satisfy the following conditions: (1) the answer is relevant to the topic of the question; (2) the answer presents the reasons or causes that the question asks; and (3) the answer presents the causality between expressions (1) and (2) in the discourse structure of the answer texts. In the example shown in FIG. 1, we assume that an answer candidate 32 to a question 30 is obtained. The question 30 is "WHY DOES A TSUNAMI OCCUR?"

Referring to FIG. 2, the answer candidate 32 includes a second sentence 40 that reads "THIS IS THE CAUSE OF A TSUNAMI OCCURRENCE." This second sentence 40 relates to the same topic (tsunami, occurrence) as that of the question 30. Therefore, answer candidate 32 satisfies the condition (1) above.

Referring to FIG. 3, answer candidate 32 includes a first sentence 42 that reads "WHEN AN EARTHQUAKE OCCURS AT THE SEA BOTTOM, SEA SURFACE RISES AND COLLAPSES AT A STRETCH." The first sentence 42 may be regarded as an answer to the question. Therefore, the answer candidate 32 satisfies the above-described condition (2).

That conditions (1) and (2) are satisfied does not mean that the answer candidate 32 is an appropriate answer to the question 30. Therefore, we must find whether there is an expression that represents the causality in the answer candidate 32. Then, we can find the expression 44, "THE CAUSE," as shown in FIG. 4. This expression indicates that there is causality between the contents of the first sentence 42 and the second sentence 40. In other words, the answer candidate 32 also satisfies the condition (3). Thus, answer candidate 32 can be determined to be an appropriate answer to the question 30.

In the following embodiment, a CNN, which is one type of the deep neural networks (DNNs), determines whether or not an answer candidate 32 is an appropriate answer to a question 30, based on whether the three conditions above are satisfied or not. For this determination, training is done beforehand such that expressions of question topics, expressions of cause asked by the question and expressions related to causality between the two are reflected on the attention in the CNN. Here, CNN is trained using not only the contexts obtained from the viewpoint of the causality but also the contexts obtained from the viewpoint of the general expressions different from the causality, to consider the word meanings in the contexts of different viewpoints.

Specifically, referring to FIG. 5, we assume that the question 30 includes an expression 62 "TSUNAMI OCCURS." Then, whether or not the answer candidate 32 presents a cause asked by the question 30 is determined by focusing on words 50, 52, 54 and 56, i.e., "an earthquake," "sea bottom," "the sea surface: and "collapses" shown in FIG. 5, which often appear with expressions representing the cause of tsunami. Further, whether or not the answer candidate 32 is relevant to the topic of the question 30 is determined based on whether an expression (expression 60 of answer candidate 32) similar to the expression 62 exists or not.

Further, for these determinations, the attentions from the following two viewpoints, that is, the word relations obtained in the causality context and the word relations obtained in the general context are used to improve the accuracy of CNN determination.

Referring to FIG. 6, by way of example, the words 50, 52, 54 and 56 shown in FIG. 5 and the word "TSUNAMI" are mapped on a vector space representing the word meanings. Semantic vectors obtained in the general context are positioned such that, in accordance with the general meanings of respective words, those having similar meanings are close to each other and those not having similar meanings are apart from each other, as shown in FIG. 6. On the other hand, when these words are mapped on a vector space of semantic vectors in accordance with the context obtained from the viewpoint of the causality, words having causality of "CAUSING TSUNAMI" with the word "TSUNAMI" come to be positioned close to each other, as shown in FIG. 7.

Therefore, the semantic vector positions 80, 82, 84, 86 and 88 of respective words in the general context vary differently from the semantic vector position 90 of the word "TSUNAMI" as shown in FIG. 8. This represents the general semantic expressions of the words and suitably usable for training the conditions of the relevance of the answer candidate to the topic of the question. For example, an expression "TSUNAMI IS CAUSED" and "TSUNAMI OCCURS" have meanings similar to each other and, therefore, when the former expression appears in a question, an answer candidate including the latter expression has relevance to the topic of the question, and this example is suitable for learning this aspect.

Figure 9:
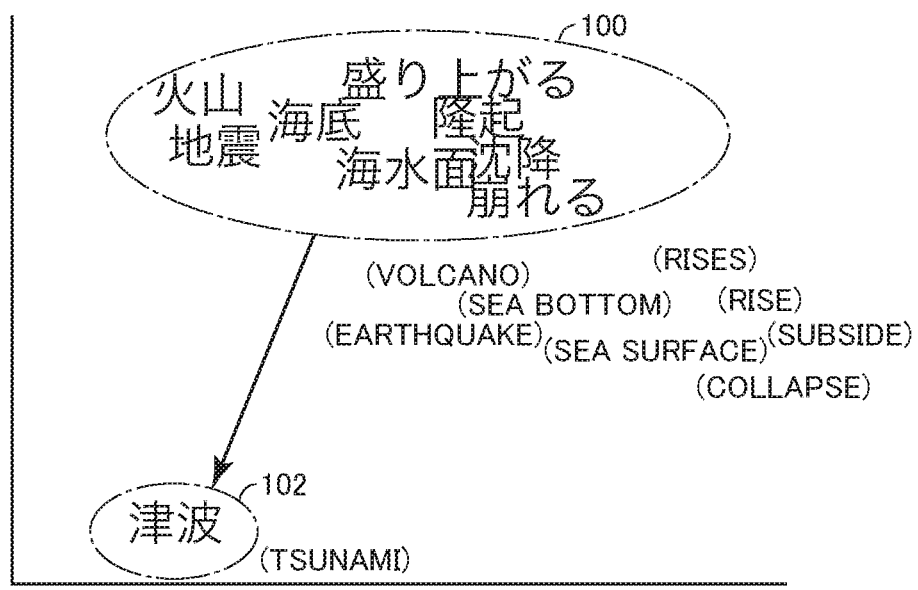
FIG. 9 shows the relations of the word vectors between the cause and the result in the causality context.

By contrast, the semantic vectors of respective words 50, 52, 54 and 56 shown in FIG. 5 in the context obtained from the causality context are congregated in an area 100 as shown in FIG. 9, and the relations between these words and the word 102, "TSUNAMI" are very similar to each other. Therefore, training CNNs by mapping the words to a vector space of semantic vectors using the causality context, makes it easier to generalize the semantic patterns of the causality, and hence it becomes easier to learn the relation patterns between words.

In the present embodiment, as a word semantic vector, a so-called word embedding vector (for example, one obtained by word2vector) is used. In the present embodiment, the number of dimensions d of the vector is 300 (same in the following). It is known that among the word embedding vectors, those corresponding to words having similar meanings are similar, and that if the semantic relation between a certain word pair is similar to the semantic relation between another word pair, the difference between the word pairs is also similar. Utilizing such characteristics of the word embedding vectors, they are used as word semantic vectors in the present embodiment. In the following, word embedding vectors are also simply referred to as "word vectors." In the present embodiment, a word is once converted to a so-called "hot one vector" and then converted to a word vector.

Further, as a characteristic of the embodiments below, multi-layer CNNs are used for determining whether or not an answer candidate is an appropriate answer to the question. Here, the "multi-layer" means that the CNNs include a CNN for comprehending the sentence level meaning of a combination of a question and an answer, and a CNN responsive to its output for comprehending the meaning of an entire passage including a plurality of sentences.

Further, as described above, a CNN for the context obtained from the viewpoint of causality, and a CNN for the context obtained from a general viewpoint not limited to a specific relation of causality, are provided in parallel, and the outputs from these CNNs are put together on the final layer to make the final determination. In the present Specification, such a CNN that determines relevance of an answer passage to a question using attentions obtained in the contexts of a plurality of relations is referred to as a Convolutional Neural Network with Multi-perspective text Representation, or mrCNN.

[Configuration]

Figure 10:
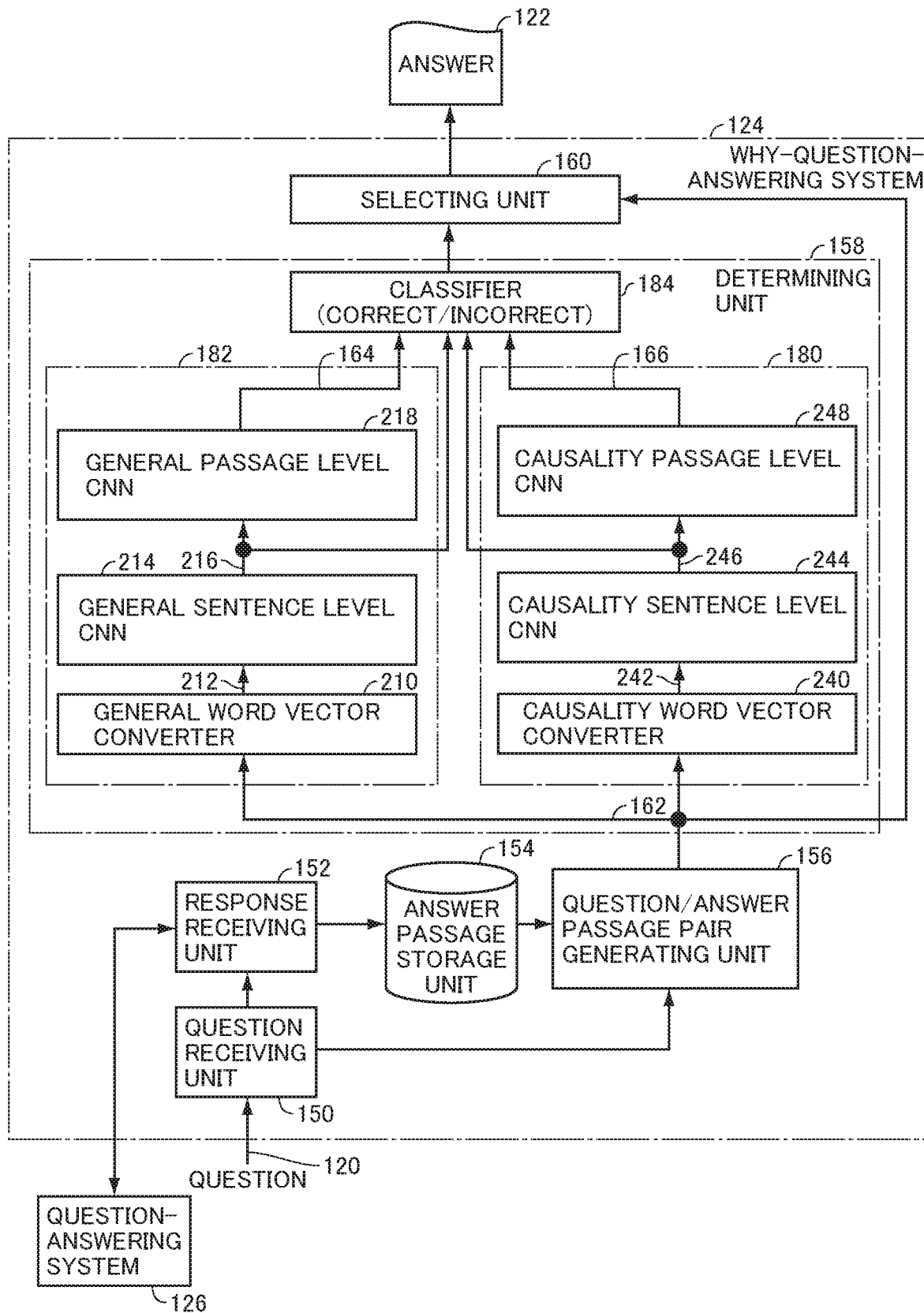
FIG. 10 is a functional block diagram of a why question-answering system in accordance with a first embodiment of the present invention.

Referring to FIG. 10, a why-question-answering system 124, which is an example of the non-factoid question-answering system in accordance with the present invention, receives a question 120, receives answer candidates to question 120 from an existing question-answering system 126, selects from the candidates a candidate appropriate as an answer to question 120, and outputs it as an answer 122.

Why-question-answering system 124 includes: a question receiving unit 150 that receives the question 120 through a user interface, not shown, or through remote transmission; and a response receiving unit 152 that transmits the question received at the question receiving unit 150 to the question-answering system 126, receives answer candidates from question-answering system 126, divides them into passages each including sentences, and outputs them. Each of the answer passages output from the response receiving unit 152 includes consecutive five sentences. In the present embodiment, a passage and the following passage share four sentences. In other words, each answer passage consists of a set of five sentences, shifted by one sentence from the preceding passage.

The why-question-answering system 124 further includes: an answer passage storage unit 154 that stores answer passages output from response receiving unit 152; and a question/answer passage pair generating unit 156 that generates question/answer pairs 162 coupling each answer passage stored in the answer passage storage unit 154 with the question 120 received by the question receiving unit 150.

Why-question-answering system 124 further includes: a determining unit 158 implemented by the above-mentioned mrCNN, that receives each of the question/answer passage pairs generated by the question/answer passage pair generating unit 156, determines whether or not the answer passage included in the pair is a correct answer, and outputs the result of determination; and a selecting unit 160 that selects, in response to the result output from determining unit 158, a character sequence to be an answer from the answer passage that provides a correct answer to the question 120 from the answer passages stored in answer passage storage unit 154, and outputs it as an answer 122.

As described above, determining unit 158 includes: a causality mrCNN 180 that outputs, using attention based on the context obtained from the causality, a vector representing the meaning of the input question/answer passage pair; and a general mrCNN 182 that outputs, using attention (similarity attention) based on the general context, a vector representing the meaning of the input question/answer passage pair.

The determining unit 158 further includes: a classifier 184 that determines, based on the outputs from the causality mrCNN 180 and the general mrCNN 182, whether or not the answer passage of the question/answer passage pair is a correct answer to the question, and applies the result as TRUE/FALSE to the selecting unit 160. The causality mrCNN 180 and the general mrCNN 182 convert a word to a word vector in different ways; however, that is the only difference and their architectures are the same in other respects. Therefore, the architecture of the general mrCNN 182 will be described and detailed description of the causality mrCNN 180 will not be repeated.

The general mrCNN 182 includes a general word vector converter 210 that converts each of the words forming the question q and the answer passage p included in the question/answer pair 162 given from the question/answer passage pair generating unit 156 into a word vector and outputs a word vector sequence 212 consisting of two word vector sequences corresponding to the question q and the answer passage p. The word vector sequence forms a matrix. The general word vector converter 210 must be pretrained using general sentences. Training of the general word vector converter 210 will be described later with reference to FIG. 11.

The general mrCNN 182 further includes: a general sentence level CNN 214 for receiving the word vector sequence 212 and outputting a general sentence level semantic representation 216 consisting of the two vectors respectively representing the sentence-level meanings of the question/answer in the general context of each sentence; and a general passage level CNN 218 for receiving the general sentence level semantic representation 216 from the general sentence level CNN 214, outputting a general passage level representation 164 consisting of the two vectors respectively representing the meanings of the question/answer as an entire passage viewed in the general context, and inputting it to the classifier 184.

The causality mrCNN 180 includes a causality word vector converter 240 for converting, as does the general word vector converter 210, each of the words forming the question and the answer passage included in the question/answer pair 162 given from the question/answer passage pair generating unit 156 into a word vector and outputting a word vector sequence 242 consisting of respective corresponding word vector sequences. The causality word vector converter 240 must be pretrained using the sentences representing the causality. Training of the causality word vector converter 240 will be also described later with reference to FIG. 11.

The causality mrCNN 180 further includes: a causality sentence level CNN 244 for receiving the word vector sequence 242 and outputting a causality sentence level semantic matrix 246 consisting of the two vectors respectively representing the sentence-level meanings of the question/answer in the causality context of each sentence; and a causality passage level CNN 248 for receiving the causality sentence level semantic matrix 246 from the causality sentence level CNN 244, outputting the causality passage level representation 166 consisting of the two vectors respectively representing the meanings of the question/answer as an entire passage viewed in the causality context, and inputting it to the classifier 184.

Figure 11:
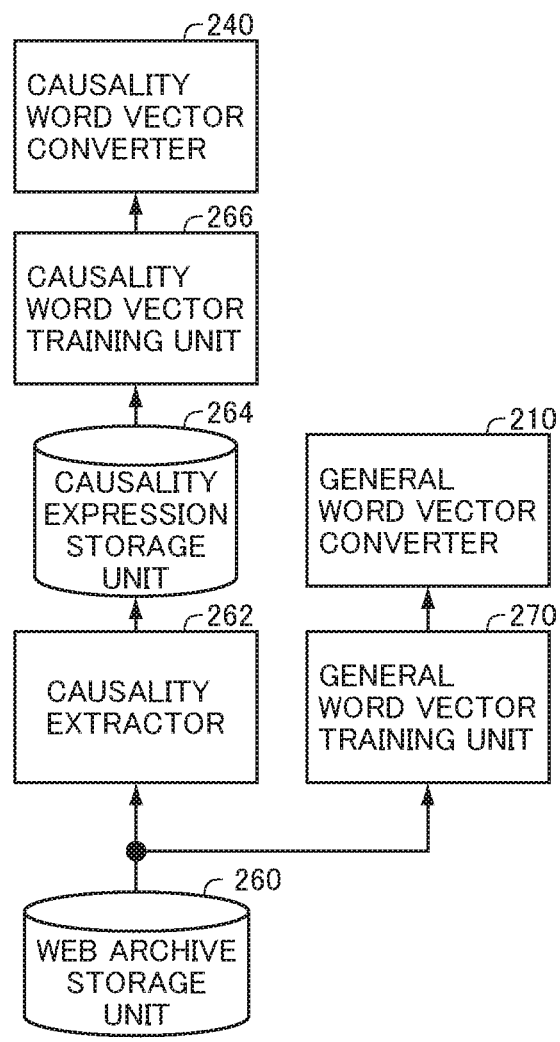
FIG. 11 schematically shows a configuration of a learning system for a converting unit for converting the words to the word embedding vectors (hereinafter simply referred to as "word vectors") in the why question-answering system shown in FIG. 10.

Referring to FIG. 11, the training of the general word vector converter 210 and the causality word vector converter 240 will be described. Basically, the methods of training the general word vector converter 210 and the causality word vector converter 240 are the same except for the data (sentences) used for training. By way of example, the data collected from the WEB is stored in a web archive storage unit 260. For training the general word vector converter 210, a general word vector training unit 270 trains the general word vector converter 210 using basically all the data stored in the web archive storage unit 260 The general word vector training unit 270 trains the general word vector converter 210 using the skip-gram with negative-sampling in word2vec to convert a one-hot vector representing a word to a d-dimensional word vector.

In contrast, for the training of the causality word vector converter 240, a causality extractor 262 extracts only those portions including the causality expressions from the sentences stored in the web archive 260. These portions are stored in a causality expression storage unit 264. A causality word vector training unit 266 trains the causality word vector converter 240 using the word2vec by the skip-gram with negative-sampling, as in the case of the general word vector training unit 270, using the expressions stored in the causality expression storage unit 264. It is noted, however, that the word context information used for training causality word vectors is obtained in a manner different from that for training general word vectors. Specifically, in a causality expression, word context in a cause part consists of all the words in the result part (or it may consist only of content words). On the other hand, as to the words in the result part, all the words in the cause part are used as its context information.

As described above, while the methods of training by the general word vector training unit 270 and the causality word vector training unit 266 are common, the data used for learning is different such that it is the general text in the former and the causality text in the latter. In word2vec, word vectors change depending on the frequency of words appearing around the words of interest and, hence, one same word may be converted to different word vectors by the general word vector converter 210 and the causality word vector converter 240. Causality expressions may be manually collected or may be collected by some machine learning in any way. In order to collect a huge amount of causality expressions, it is desirable to use a classifier trained by the machine leaning.

«General Sentence Level CNN 214»

Figure 12:
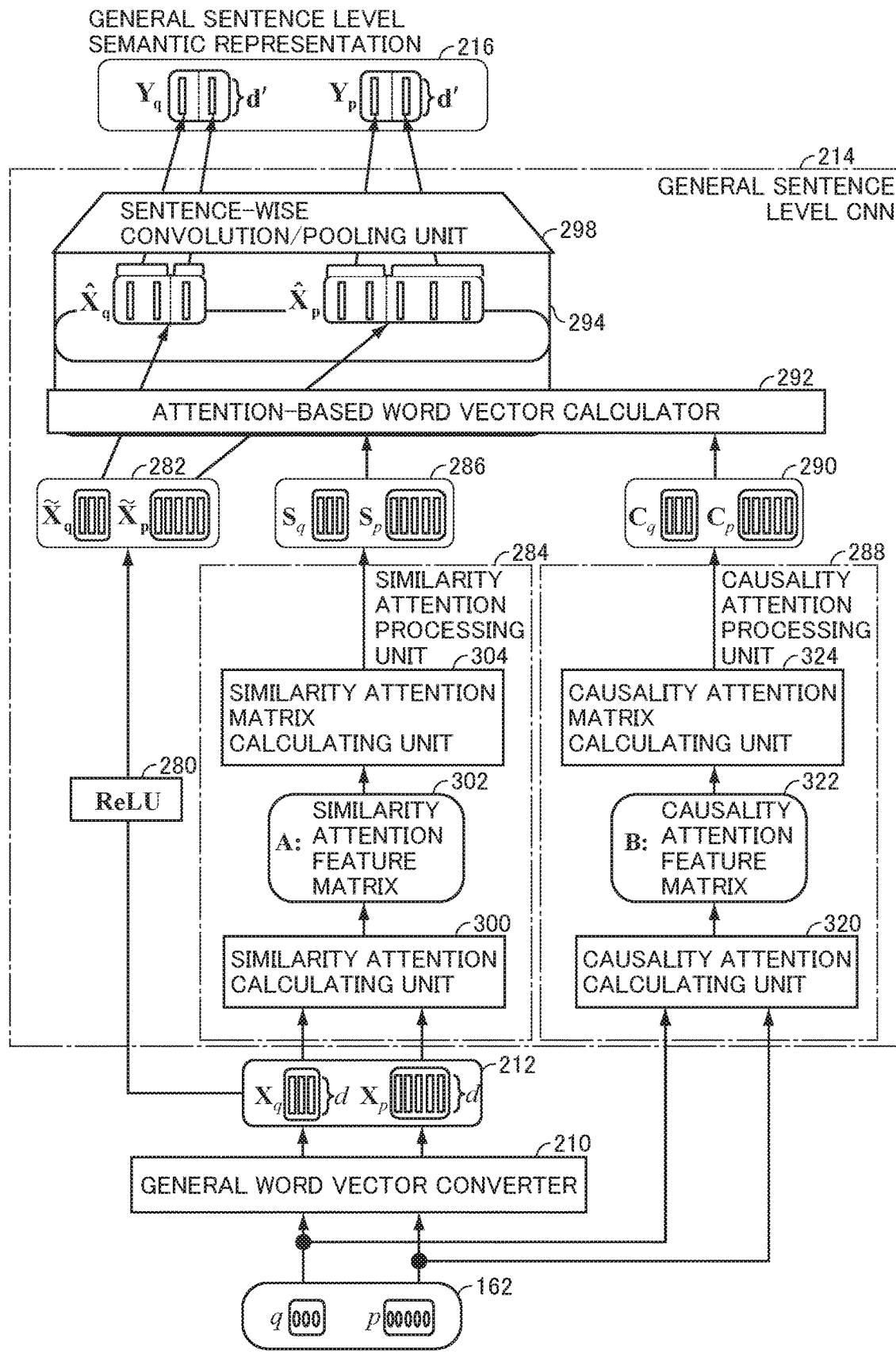
FIG. 12 schematically shows a configuration of one of the multi-stage/multi-column CNNs shown in FIG. 10 which is for obtaining a sentence level representation based on general context.

Referring to FIG. 12, the architecture of the general sentence level CNN 214 will be described. It is understood that a question/answer pair 162 includes a question q and an answer passage p. The general word vector converter 210 immediately preceding the general sentence level CNN 214 receives the question q and the answer passage p, converts them to word vector sequences Xq and Xp, respectively, and inputs them as word vector sequences 212 to the general sentence level CNN 214. Specifically, word vector sequence 212 includes word vector sequences Xq and Xp. The word vector sequence Xq is d×I dimensional, and the word vector sequence Xp is d×J dimensional, where I and J are length of the question q and the passage p (number of the words included in the question and the passage), respectively.

The general sentence level CNN 214 includes a sparse processing unit 280 for applying the activation function ReLU to each of the word vector sequences Xq and Xp and outputting the sparse word vector sequence 282. The word vector sequence 282 includes word vector sequences ~Xq and ~Xp (the sign "~" appears directly above the immediately following character).

It has been known that use of activation function ReLU is effective in training of the deep neural networks. The word vector sequences ~Xq and ~Xp are given by the following equations.

$$\tilde{X}_q = \text{ReLU}(U_q X_q)$$

$$\tilde{X}_p = \text{ReLU}(U_p X_p)$$

$$\text{ReLU}(x) = \max(0, x) \qquad (1)$$

Here, Uq and Up are real number matrices of d×d dimensions obtained through training.

The general sentence level CNN 214 further includes a similarity attention processing unit 284 for receiving the word vector sequences Xq and Xp and calculating a similarity attention matrix 286. The similarity attention matrix 286 includes a similarity attention matrix Sq for the question sentences and a similarity attention matrix Sp for the answer passages.

The general sentence level CNN 214 further includes a causality attention processing unit 288 for receiving a question/answer pair 162 and calculating a causality attention matrix 290. The causality attention matrix 290 includes a causality attention matrix Cq for a question sentence and a causality attention matrix Cp for an answer passage. Dimensions of the matrices Sq and Cq are the same as ~Xq, that is, d*I, and dimensions of the matrices Sp and Cp are the same as ~Xp, that is, d*J. The similarity attention matrices Sq and Sp and the causality attention matrices Cq and Cp will be described later.

The general sentence level CNN 214 further includes an attention-based word vector calculator 292 for calculating an attention-weighted word vector sequence 294, by performing the following operations on the word vector sequences ~Xq and ~Xp, the similarity attention matrices Sq and Sp and the causality attention matrices Cq and Cp. The final word vector sequence 294 includes the final word vector sequence ^Xq and the word vector sequence ^Xp.

$$\hat{X}_q = \text{ReLU}(V_q(\tilde{X}_q + S_q + C_q))$$

$$\hat{X}_p = \text{ReLU}(V_p(\tilde{X}_p + S_p + C_p)) \qquad (2)$$

The general sentence level CNN 214 further includes a sentence-wise convolution/pooling unit 298 for performing sentence by sentence convolution and pooling on the final word vector sequences ^Xq and ^Xp and outputting a general sentence level semantic representation 216 representing the sentence level meaning of the question q and the answer passage p. The general sentence level semantic representation 216 includes vector sequences Yq and Yp.

The similarity attention processing unit 284 includes a similarity attention calculating unit 300 for calculating a similarity attention feature matrix 302, and a similarity attention matrix calculating unit 304 for calculating the similarity attention matrices Sp and Sq using the similarity attention feature matrix 302.

Let us call the similarity attention feature matrix 302 as matrix A, which has I rows and J columns. Each of its elements is the similarity of the word vectors of the words in each combination of the words included in the question q and the words in the answer passage. In the present embodiment, we use the vector cosine similarity as the similarity measure. After computing the matrix A, we apply row-wise and column-wise max-pooling, to produce two feature vectors related to the similarity attention. Specifically, one is the feature vector $a_q$ for the question q and the other is the feature vector $a_p$ for the answer passage. Elements of the feature vectors $a_q$, $a_p$ are given as $$a_q = [\max(A_{1,:}), \ldots, \max(A_{I,:})]$$

$$a_p = [\max(A_{:,1}), \ldots, \max(A_{:,J})] \quad (3)$$

where $A_{i,:}$ and $A_{:,j}$ represent sets of the elements of the i-th row and the elements of the j-th column of the matrix A.

These feature vectors allow us to know the most similar word across the counterpart text for each word in the question q or answer passage p, serving as useful reference in adding a similarity attention weight to each word.

The similarity attention matrix calculating unit 304 calculates the feature vectors $a_q$ and $a_p$ in this manner, and using these vectors, calculates the similarity attention matrices Sq and Sp as follows.

$$S_q = g_q a_q^T \in R^{d \times I}$$

$$S_p = g_p a_p^T \in R^{d \times J} \quad (4)$$

where $g_q \in R^d$ and $g_p \in R^d$ are model parameters to be learned during training, and d represents the word vector dimension (d=300 in the present embodiment).

The causality attention processing unit 288 includes: a causality attention calculating unit 320 for receiving a question/answer pair 162, and calculating the causality attention feature matrix 322; and a causality attention matrix calculating unit 324 for calculating the causality attention matrix 290 using the causality attention feature matrix 322. The causality attention matrix 290 includes the causality attention matrices Cq and Cp.

Let us call the causality attention feature matrix 322 as matrix B, which has I rows and J columns. In the present embodiment, matrix B is calculated by using the normalized point-wise mutual information (npmi), which represents the strength of the causal association between a cause word a and a result word b, defined as:

$$npmi(a; b) = \frac{pmi(a; b)}{-\log p(a, b)} \quad (5)$$

$$pmi(a; b) = \log \frac{p(a, b)}{p(a, *) p(*, b)}$$

Here, p(a, b) is the probability that words a and b are respectively in the cause and result parts of the same causality expression. This probability can be obtained statistically from the causality expressions stored in the causality expression storage unit 264 shown in FIG. 11. p(a, *) and p(*, b) are the probabilities that word a appears in the cause part and word b appears in the result part in the entire causality expressions stored in causality extractor 262. The value npmi(a;b) ranges between −1 and 1. It becomes close to 1 (denoting the strong causal association) if words a and b frequently co-occur as words in the cause and the result parts of the same causality expression.

Using this npmi, matrix B is defined as $$b_{ij} = \text{ReUL}(npmi(w_{p,j}; w_{q,i})) \in R \quad (6)$$

where $w_{q,i}$ and $w_{p,j}$ are respectively the i-th word in the question q and the j-th word in the answer passage p. It is noted that the question and the answer passage words are regarded as the cause and the result words, respectively, in computing matrix B.

As in the similarity attention, the causality attention matrix calculating unit 324 applies the row-wise and column-wise max pooling to matrix B to produce two causality attention feature vectors $bq \in R^I$ and $bp \in R^J$. The causality attention feature vectors obtained in this manner have, as elements, the scores indicating the highest causality across the words in the counterpart text for each word in the question and the answer passage.

The causality attention matrix calculating unit 324 further computes the causality attention matrices Cq and Cp as follows.

$$C_q = h_q b_q^T \in R^{d \times I}$$

$$C_p = h_p b_p^T \in R^{d \times J} \quad (7)$$

where $h_q \in R^d$ and $h_p \in R^d$ are model parameters to be learned during training.

The sentence-wise convolution/pooling unit 298 performs the sentence-wise convolution and pooling. The sentence-wise convolution/pooling unit 298 decomposes the final word vector sequences $\hat{X}q$ and $\hat{X}p$ into matrices, each of which corresponds to a sequence of words in a single sentence.

Let $\hat{X}_q = [\hat{x}_{q,1}, \ldots, \hat{x}_{q,I}]$ denote the final word vector sequence for question q, and $\langle \hat{X}_q^m \rangle = [\hat{x}_{q,sb(m)}^m, \ldots, \hat{x}_{q,se(m)}^m]$ denote all the words in the m-th sentence, where sb(m) and se(m) respectively represent the indexes of the first and the final words of the m-th sentence. Then we can represent $\hat{X}_q$ as $\hat{X}_q = [\langle \hat{X} \rangle_q^1, \ldots, \langle \hat{X} \rangle_q^M]$, where M is the number of sentences in question q. In the same way, we can have $\hat{X}_p = [\langle \hat{X} \rangle_p^1, \ldots, \langle \hat{X} \rangle_p^N]$ where N is the number of sentences in the answer passage. The convolution/pooling unit 298 applies the convolution and pooling to $\langle \hat{X} \rangle_q^m$ and $\langle \hat{X} \rangle_p^n$ in a sentence-wise manner to produce the sentence-meaning representation for each sentence.

The sentence-to-sentence convolution and pooling is done in the following manner.

Let us represent the concatenated embedding for t consecutive words (or t-gram) in $\langle \hat{X}_q^m \rangle$ as $$\hat{x}'_{i:i+t-1} = [\hat{x}'_i^m, \ldots, \hat{x}'_{i+t-1}^m] \in R^{d \times t} \quad (8)$$

We generate the representation $o_i^m \in R$ for $\hat{x}'_{i:j+t-1}^m$ using a convolution operation with the filter $w \in R^{d \times t}$ $$o_i^m = \text{ReLU}(w \bullet \hat{x}'_{i:i+t-1}^m + e),$$

where $e \in R$ is a bias term, and • denotes the Frobenius inner product. The filter is applied to each possible combination of the t-gram to produce $o^m$. Then, a max-over-time pooling operation over representation $o^m$ is applied to take the maximum value of $\hat{o}^m = \max(o^m) \in R$. This value $\hat{o}^m$ is the feature of this particular filter w.

In the experiment, for obtaining the feature vectors, we used combinations of multiple filters and variety of window sizes ($1 \leq t \leq 5$) as the value t of word t-grams. By way of example, we used three filters and 2, 3, 4-grams to calculate feature vectors.

Let the feature vectors of the m-th sentence in the question q and the n-th sentence in the answer passage p be $y_{q,m}$ and $y_{p,n}$, respectively. Sentence level representation Yq and Yp of the question q and the answer passage p are denoted as $$Y_q = [y_{q,1}, \ldots, y_{q,M}] \in R^{d' \times M},$$

$$Y_p = [y_{p,1}, \ldots, y_{p,N}] \in R^{d' \times N}. \quad (9)$$

where d' is defined as $d'_1 + d'_2$ ($d'_1$ represents the filter size and $d'_2$ is the number of t-grams applied to the filters).

Figure 13:
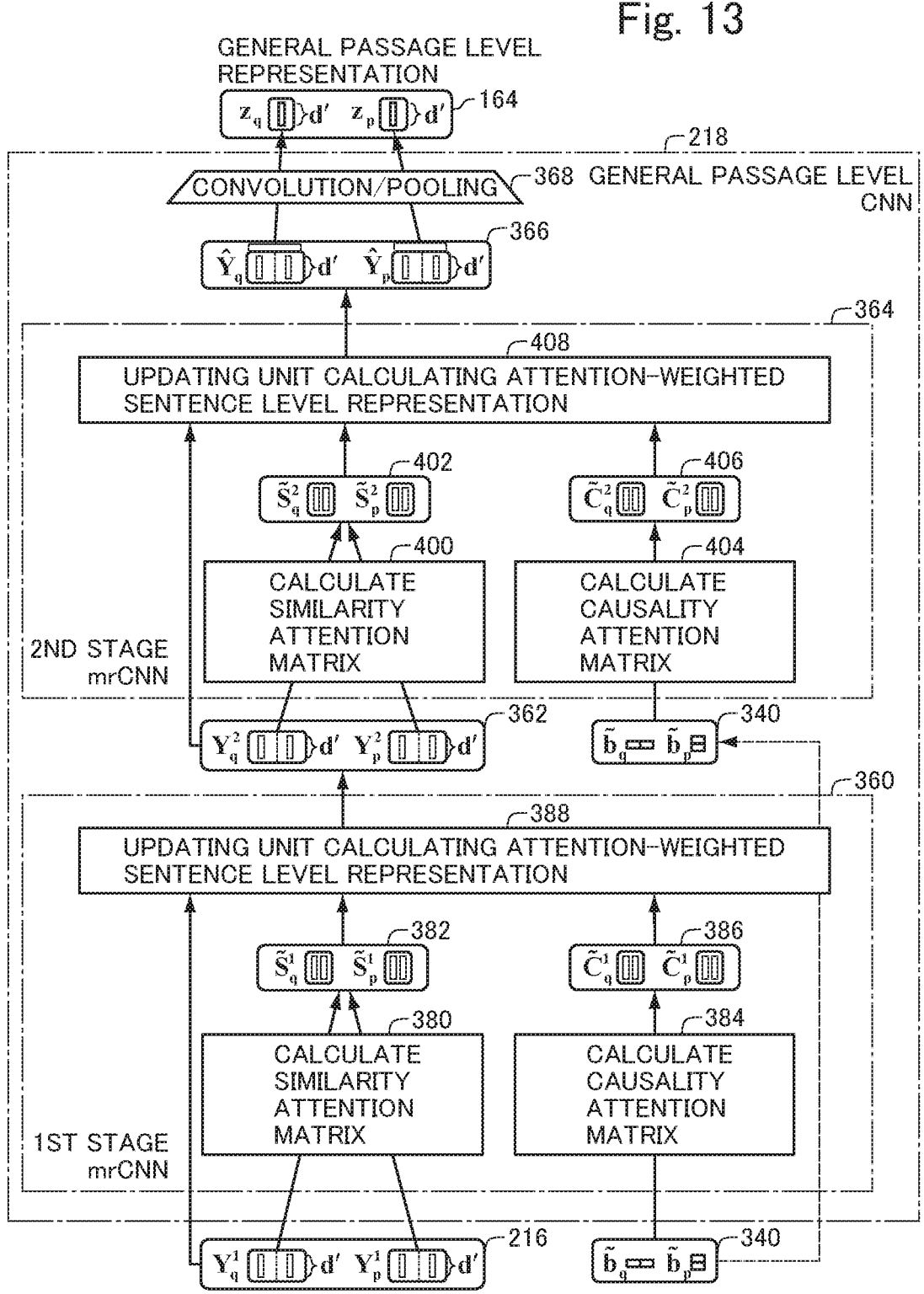
FIG. 13 schematically shows a configuration of that specific CNN of the multi-stage/multi-column CNNs shown in FIG. 10 which is for obtaining a passage level representation, receiving an output of the network shown in FIG. 12.

$Y_q$ and $Y_p$ are given to the passage level CNN 218 shown in FIGS. 10 and 13.

«General Passage Level CNN 218»

Referring to FIG. 13, the general passage level CNN 218 receives the general sentence level semantic representations 216 and the feature vectors 340 (as will be described later) obtained from the causality attention feature matrix 322 shown in FIG. 12 as inputs, and outputs the final general passage level representations 164. For this purpose, the general passage level CNN 218 iterates the attention application K times (K=2 in the present embodiment) and updates the general sentence level semantic representations 216 to gradually narrow down the final answer.

General passage level CNN 218 includes a first stage mrCNN 360 and a second stage mrCNN 364.

The architecture of mrCNN 360 (K=1) is the same as that of mrCNN 364 (K=2).

Let $Y^k$ be a sentence level representation of a question or an answer passage in the k-th stage ($Y_q^k$ and $Y_p^k$), and $\tilde{S}^k$ and $\tilde{C}^k$ be the similarity attention and the causality attention matrices for the k-th repetition, respectively, where $Y^1 = Y$. We will define $\tilde{S}^k$ and $\tilde{C}^k$ later.

In the general passage level CNN 218, the sentence level representations are updated in accordance with the following equation.

$$Y^{k+1} = \text{ReLU}(W^k(Y^k + \tilde{S}^k + \tilde{C}^k)) \tag{10}$$

where $W^k$ is the weight matrix for the k-th iteration to be learned during the training. Convolution/pooling is applied to $\hat{Y} = Y^{k+1}$, which is the result of K-th iteration output, that is, the output of mrCNN 364. As a result, the general passage level representation 164 is produced.

mrCNN 360 includes: a similarity attention calculating unit 380 for calculating a similarity attention matrix 382 from the vector sequences Yq(Yq$^1$) and Yp(Yp$^1$) included in the general sentence level semantic representation 216; a causality attention calculating unit 384 for calculating a causality attention matrix 386 from the feature vectors 340 (as will be described later) obtained from the causality attention feature matrix 322 shown in FIG. 12; and an updating unit 388 for weighting and updating the general sentence level semantic representation 216 using the attention matrices 382 and 386 and outputting the updated general sentence level semantic representation 362. The general sentence level semantic representation 362 is the sentence level representation of the first repetition.

Feature vectors 340 include feature vectors $\bar{b}_q$ and $\bar{b}_p$. The feature vectors $\bar{b}_q$ and $\bar{b}_p$ are calculated as shown below from feature vectors $b_q$ and $b_p$ obtained from causality attention feature matrix 322 shown in FIG. 12.

As described above, sb(m) and se(m) respectively represent the indexes of the first and the final words in the m-th sentence. The feature vectors $\bar{b}_q$ and $\bar{b}_p$ are given as follows:

$$\bar{b}_q = [\bar{b}_{q,1}, \ldots, \bar{b}_{q,M}] \in R^M,$$

$$\bar{b}_p = [\bar{b}_{p,1}, \ldots, \bar{b}_{qP,N}] \in R^N. \tag{11}$$

which are computed by $$\bar{b}_m = \text{avg}([b_{sb(m)}, \ldots, b_{se(m)}]) \in R.$$

This represents a causality feature for the m-th sentence.

Next, the causality attention matrices $\tilde{C}_q^k \in R^{d' \times M}$ and $\tilde{C}_p^k \in R^{d' \times N}$ are computed by $$\tilde{C}_q^k = \tilde{h}_q^k \bar{b}_q^T,$$

$$\tilde{C}_p^k = \tilde{h}_p^k \bar{b}_p^T. \tag{12}$$

where $\tilde{h}_q^k \in R^{d'}$ and $\tilde{h}_p^k \in R^{d'}$ are model parameters to be learned by training.

mrCNN 364 has the same architecture as mrCNN 360, and it includes: a similarity attention matrix calculating unit 400 for receiving the general sentence level semantic representations 362 as inputs and calculating the similarity attention matrix 402; a causality attention calculating unit 404 for receiving the feature vectors 340 as inputs and calculating the causality attention matrix 406; and an updating unit 408 for weighting and updating the general sentence level semantic representation 362 by the attentions based on the attention matrices 402 and 406 and outputting the updated general sentence level semantic representation 366.

The general sentence level semantic representation 366 includes the word vector sequence $\hat{Y}_q$ of each sentence of question and the word vector sequence $\hat{Y}_p$ of each sentence of the answer passage. These vectors are both d' dimensional.

The general passage level CNN 218 further includes a convolution/pooling unit 368 for applying convolution/pooling to the general sentence level semantic representation 366 to produce the general passage level representation 164. In the present embodiment, the convolution/pooling unit 368 has the same architecture as the sentence-wise convolution/pooling unit 298 shown in FIG. 12.

The general passage level representation 164 includes the passage level representation $z_q \in R^{d'}$ of the question and the passage level representation $z_p \in R^{d'}$ of the answer passage. These are input to the classifier 184 shown in FIG. 10.

The classifier 184 is implemented by a logistic regression layer. The logistic regression layer is a fully connected layer using the dropout and having a softmax output. In the general passage level representation 164 and the general sentence level semantic representation 216 output from the general mrCNN 182 and in the causality passage level representation 166 and the causality sentence level semantic matrix 246 output from the causality mrCNN 180, the classifier 184 connects expressions of question/answer passage pairs, and calculates the similarity between the representation of a question and the representation of an answer passage from the same CNN in accordance with the following equations.

For the sentence level representation Y, $$ss(Y) = \max(\{sim(y_{q,m}, y_{p,n})\}_{m=1,n=1}^{M,N}) \in R \tag{13}$$

For the passage level representation z, $$sp(z) = sim(z_q, z_p) \in R \tag{14}$$

where $sim(a,b) = 1/(1+ED(a,b))$, and $ED(\bullet)$ is the Euclidean distance.

Let $Y^g$ and $Y^c$ represent the outputs from the general sentence level CNN 214 and the causality sentence level CNN 244, respectively, and let $z^g$ and $z^c$ represent the outputs from the general passage level CNN 218 and the causality passage level CNN 248, respectively. Then the final representation r of the question q and the answer passage p can be denoted as $$r = [r_{gs}; r_{cs}; r_{gp}; r_{cp}] \tag{15}$$

where $r_{gs} = [Y_q^g; Y_p^g; ss(Y^g)]$, $r_{cs} = [Y_q^c; Y_p^c; ss(Y^c)]$, $r_{gp} = [z_q^g; z_p^g; sp(z^g)]$, and $r_{cp} = [z_q^c; z_p^c; sp(z^c)]$. Using this r as an input, the classifier 184 determines the correct/incorrect label and applies its outputs representing True/False to the selecting unit 160.

[Operation]

The why-question-answering system 124 operates in a training phase, and a service phase in which the system outputs an answer to an actual question.

The training phase is further divided into a training phase for the general word vector converter 210 and the causality word vector converter 240 shown in FIG. 11, and a training phase for the various parameters in the why-question-answering system 124 shown in FIG. 10.

<Training of Causality Word Vector Converter 240>

For training the causality word vector converter 240, referring to FIG. 11, large amounts of documents are collected from the web and stored in the web archive storage unit 260 in advance. The general word vector training unit 270 trains the general word vector converter 210 using the word2vec with the skip-gram with negative-sampling so that the general word vector converter 210 converts a one-hot vector to a d=300-dimensional word vector, using the words in each of the sentences in the web archive storage unit 260.

On the other hand, the causality extractor 262 extracts only those expressions that include the causalities from the web archive storage unit 260, and stores them in the causality expression storage unit 264. The causality word vector training unit 266 trains the causality word vector converter 240 using the same technique as the general word vector training unit 270.

The general word vector converter 210 is trained based on the general contexts regardless of the causality, while the causality word vector converter 240 is trained using only the expressions involving the causalities. Therefore, the parameters for converting words to word vectors used by these converters differ, resulting in a conversion to word vectors that have the meanings from the general viewpoint and a conversion to word vectors that have the meanings from the causality viewpoint.

<Training of Why-Question-Answering System 124>

The why-question-answering system 124 is trained in similar manner as a common neural network, by preparing positive and negative examples of sets of questions and answer passages. The operation of the why-question-answering system 124 until it derives an output of the classifier 184 is the same as its operation in the service phase and, therefore, description thereof will not be given here. After an output of the classifier 184 is obtained, the training is done by the error back-propagation as in the common neural network in accordance with the result. While the training is iterated, the end condition may be selected appropriately, for example, the iteration may be stopped when the number of the iteration reaches a prescribed number, or the total amount of the change in the parameters becomes equal to or smaller than a threshold value.

<Service Phase>

In service, referring to FIG. 10, when the question 120 is given to the question receiving unit 150, the question receiving unit 150 applies the question to the response receiving unit 152 and the question/answer passage pair generating unit 156. The response receiving unit 152 applies this question to the existing question-answering system 126, obtains its answer, divides it to an answer passage consisting of a plurality of sentences, and stores them in the answer passage storage unit 154. Each of the answer passages output from the response receiving unit 152 includes five consecutive sentences.

The question/answer passage pair generating unit 156 generates the question/answer pairs 162 by coupling each answer passage stored in the answer passage storage unit 154 with the question 120 received by the question receiving unit 150, and applies them to the general word vector converter 210 and the causality word vector converter 240.

Referring to FIG. 12, the general word vector converter 210 converts the question and the answer passage included in the question/answer pair 162 to the word vectors and outputs the word vector sequence 212.

The sparse processing unit 280 applies the activation function ReLU to the word vector sequence 212 and outputs the word vector sequences ~Xq and ~Xp to the attention-based word vector calculator 292.

The similarity attention calculating unit 300 receives the word vector sequence 212, calculates the similarity, and generates the similarity attention feature matrix 302. Using the similarity attention feature matrix 302, the similarity attention matrix calculating unit 304 calculates the similarity attention matrix 286 and applies it to the attention-based word vector calculator 292.

The causality attention calculating unit 320 receives the question/answer pair 162 and calculates the causality attention feature matrix 322. Using the causality attention feature matrix 322, the causality attention matrix calculating unit 324 calculates causality attention matrix 290 and applies it to the attention-based word vector calculator 292.

The attention-based word vector calculator 292 applies to the word vector sequences ~Xq and ~Xp, the attention provided by the similarity attention matrices Sq and Sp and the causality attention matrix 290, calculates the final word vector sequences ^Xq and ^Xp in accordance with the equation (2) and applies these to the convolution/pooling unit 298.

The sentence-wise convolution/pooling unit 298 performs sentence-by-sentence convolution and pooling on the final word vector sequences ^Xq and ^Xp, outputs the general sentence level semantic representation 216 and applies it to the general passage level CNN 218 (see FIGS. 10 and 13).

Referring to FIG. 13, the mrCNN 360 of the general passage level CNN 218 operates in the following manner. Specifically, the similarity attention calculating unit 380 calculates the similarity attention matrix 382 from the vector sequences Yq(Yq$^1$) and Yp(Yp$^1$) included in the general sentence level semantic representation 216. The causality attention calculating unit 384 calculates the causality attention matrix 386 from the feature vectors 340 obtained from the causality attention feature matrix 322 shown in FIG. 12. The updating unit 388 for calculating the attention-weighted sentence level representation weights and updates the general sentence level semantic representation 216 using the attentions provided by the attention matrices 382 and 386, outputs the updated general sentence level semantic representation 362, and applies it to the similarity attention matrix calculating unit 400 of mrCNN 364.

The mrCNN 364 operates exactly in the same manner as the mrCNN 360. Specifically, the similarity attention matrix calculating unit 400 receives the general sentence level semantic representations 362 as inputs and calculates the similarity attention matrix 402. The causality attention calculating unit 404 receives the feature vectors 340 as inputs and calculates the causality attention matrix 406. The updating unit 408 for calculating the attention-weighted sentence level representation weights and updates the general sentence level semantic representation 362 using the attentions provided by the attention matrices 402 and 406 and outputs the updated general sentence level semantic representation 366.

The convolution/pooling unit 368 applies the convolution/pooling to the general sentence level semantic representation 366 and outputs the general passage level representation 164.

Referring to FIG. 10, the general sentence level semantic representation 216 and the general passage level representation 164 are both applied to the classifier 184.

Further, in the causality mrCNN 180 also, the same operation as in the general mrCNN 182 is performed, except that the causality word vector converter 240 converts words to word vectors from the viewpoint of causality context, rather than the viewpoint in the general context. The causality mrCNN 180 applies the causality sentence level semantic matrix 246 and the causality passage level representation 166 to the classifier 184.

As described above, in the general passage level representation 164 and the general sentence level semantic representation 216 output from the general mrCNN 182 and in the causality passage level representation 166 and the causality sentence level semantic matrix 246 output from the causality mrCNN 180, the classifier 184 connects the expressions of the question/answer passage pairs. Further, the classifier 184 calculates the similarity between the representation of a question and the representation of an answer passage from the same CNN in accordance with the Equations (13) to (15), determines whether or not the answer passage is a correct answer to the question using the softmax function, and applies the result to the selecting unit 160.

Based on the result from the classifier 184, if the answer passage is a correct answer to the question 120, selecting unit 160 selects and outputs it as the answer 122.

<Results of Experiments>

FIG. 14 shows the results of the question-answering tasks in accordance with the above-described embodiment of the present invention and its variations, together with the results of Non-Patent Literature 3 (OH13) and Non-Patent Literature 4 (OH17). In the experiments, a data set of 17,000 question-passage pairs was used as in Non-Patent Literature 3. It is noted, however, that the embodiment of the present invention uses the data during training in a manner different from that of Non-Patent Literature 3. Though a development data set is not used in Non-Patent Literature 3, the embodiment of the present invention adjusted the mrCNN hyper parameters using a development data set prepared beforehand.

The model of the embodiment of the present invention was trained with a maximum of 20 epochs, and the best model based on the precision computed on the development data was adopted. Training was terminated when there was no improvement after five epochs. Based on the development data, we examined all combinations (120 in total) of the hyper parameters: the window size of the filters: consecutive numbers (3, 4 or 5) selected from {1, 2, 3, 4, 5} (3+2+1=5 in total); the number of the filters: four different numbers {25, 50, 75, 100} for each combination of the window sizes; and the mini-batch size: five sizes {20, 40, 60, 80, 100} for the stochastic gradient algorithm with the Adadelta update rule. In training the mrCNNs of the above-described embodiment, the sentence level and the passage level CNNs were trained under the same conditions.

Referring to FIG. 14, OH13 shows the performance of Non-Patent Literature 3. Only this example uses SVMs, while other seven examples use neural networks. OH17 represents the results of Non-Patent Literature 4 as a state-of-the art. OH17 is an example that uses the causality attention only, and unlike the present invention, OH17 does not use the mrCNNs.

BaseSA, BaseCA and BaseDA provide baselines that use the sentence level text representation obtained in the contexts from the general viewpoint in the system of the above-described embodiment of the present invention. BaseSA and BaseCA use either the similarity attention or the causality attention, while BaseDA uses both.

EMBODIMENT (1 layer) to EMBODIMENT (3 layers) represent the number of layers of the passage level CNNs for obtaining the passage level representations. In the embodiment above, K=2. "Oracle" represents a system that can list all the L correct answers in the top L ranks if they are in the test data.

The examples were evaluated by the precision of the top answer (P@1), the mean average precision (MAP), and the relative performance of each example over that of Oracle (PR@1 and RMAP).

P@1 represents how many questions have a correct answer at the top. MAP measures the overall quality of the top 20 answers ranked by the systems. RP@1 and RMAP represents the evaluation using only the questions that have at least one correct answer in the test data.

As is apparent from FIG. 14, the systems in accordance with the embodiment of the present invention showed a better performance in both P@1 and MAP except for Oracle. Particularly, the system with K=2 shown in the embodiment above showed over 4 point improvement in P@1 over OH17. Further, BaseDA consistently shows higher performance than BaseSA and BaseCA. This indicates that use of both the similarity attention and the causality attention is effective to improve the performance.

[Computer Implementation]

Figure 15:
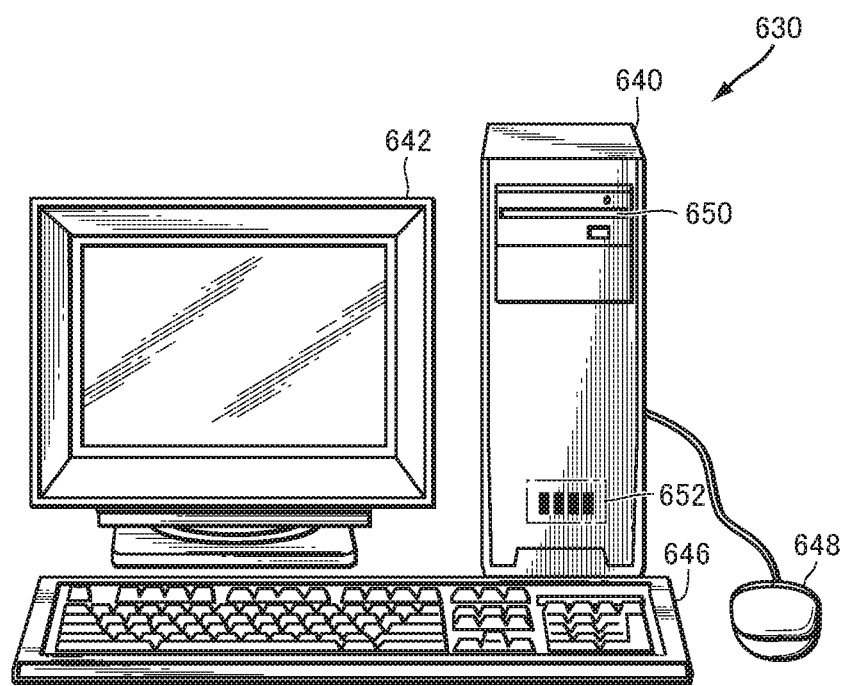
FIG. 15 shows an appearance of a computer system implementing the why-question-answering system in accordance with the various embodiments of the present invention.

The why-question-answering system 124 in accordance with the present embodiment can be implemented by computer hardware and computer programs executed on the computer hardware. FIG. 15 shows an appearance of computer system 630 and FIG. 16 shows an internal configuration of computer system 630.

Referring to FIG. 15, computer system 630 includes a computer 640 having a memory port 652 and a DVD (Digital Versatile Disk) drive 650, a keyboard 646, a mouse 648, and a monitor 642.

Figure 16:
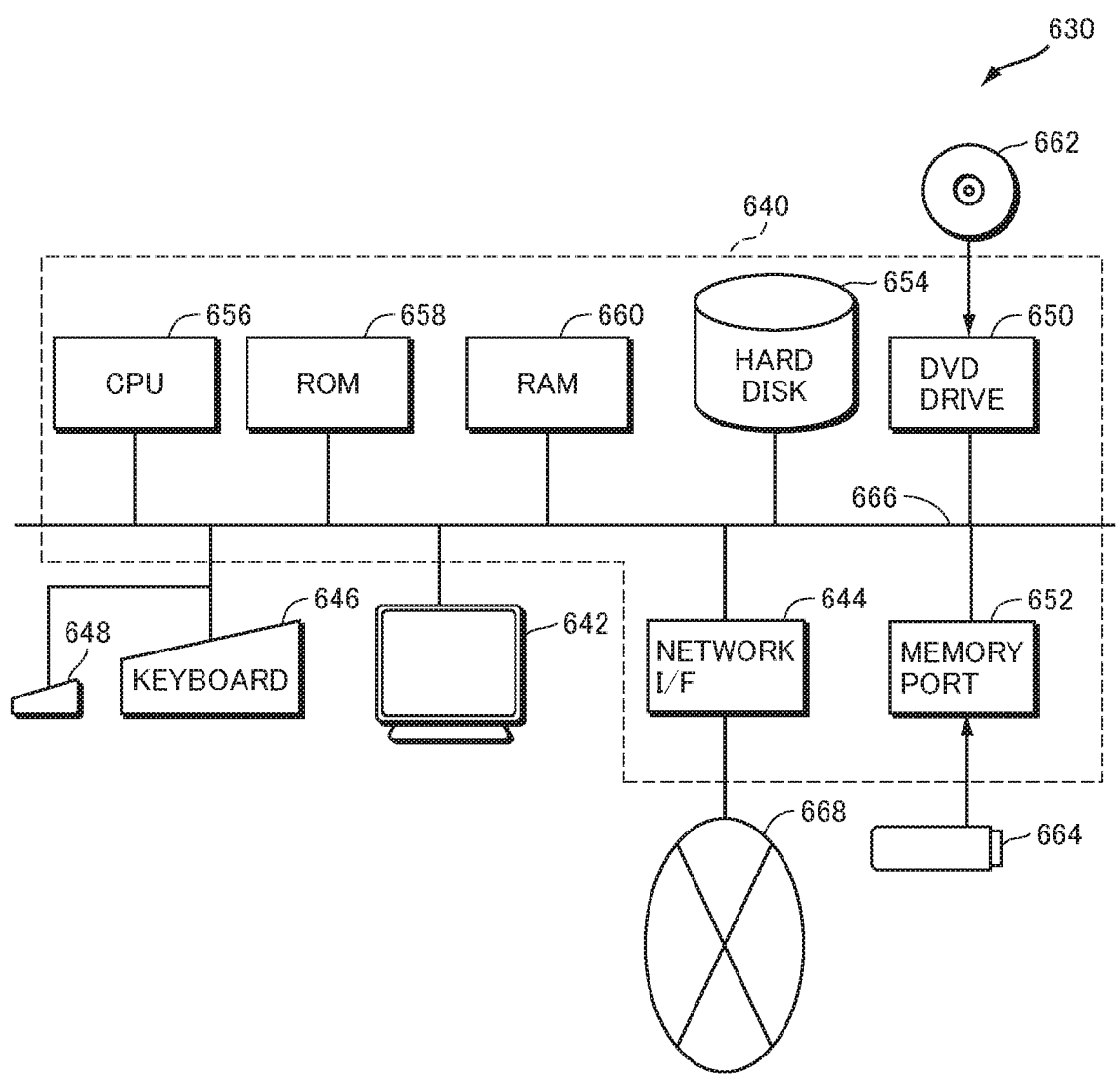
FIG. 16 is a block diagram showing the hardware configuration of the computer shown in FIG. 15.

Referring to FIG. 16, computer 640 includes, in addition to memory port 652 and DVD drive 650, a CPU (Central Processing Unit) 656, a bus 666 connected to CPU 656, memory port 652 and DVD drive 650, a read only memory (ROM) 658 for storing a boot program and the like, a random access memory (RAM) 660 connected to bus 666, for storing program instructions, a system program and work data, and a hard disk 654. Computer system 630 further includes a network interface (I/F) 644 providing the connection to a network 668 allowing communication with another terminal.

The computer program causing computer system 630 to function as each of the functioning sections of the why-question-answering system 124 in accordance with the embodiment above is stored in a DVD 662 or a removable memory 664 loaded to DVD drive 650 or to memory port 652, and transferred to hard disk 654. Alternatively, the program may be transmitted to computer 640 through network 668, and stored in hard disk 654. At the time of execution, the program is loaded to RAM 660. The program may be directly loaded from DVD 662, removable memory 664 or through network 668 to RAM 660.

The program includes an instruction sequence of plurality of instructions to cause computer 640 to operate as functioning sections of the why-question-answering system 124 in accordance with the embodiment above. Some of the basic functions necessary to cause the computer 640 to realize each of these functioning sections are provided by the operating system running on computer 640, by a third party program, or by various dynamically linkable programming tool kits or program library, installed in computer 640. Therefore, the program may not necessarily include all of the functions necessary to realize the system and method of the present embodiment. The program has only to include instructions to realize the functions of the above-described system by dynamically calling appropriate functions or appropriate program tools in a program tool kit or program library in a manner controlled to attain desired results. Naturally, all the necessary functions may be provided by the program alone.

As described above, according to the embodiments above, answers to non-factoid type questions such as why-questions can be obtained with significantly higher accuracy than the conventional methods. By building question-answering systems using as training data problems raised in a factory manufacturing line, problems found in final products, problems encountered in software tests, problems experienced during some experiments and so on, it becomes possible to obtain useful answers to various practical problems. As a result, production efficiency at factories can be improved, industrial products and software can be designed with higher efficiency, and more efficient experiment plans can be developed, resulting in major contribution to the industry. Further, applications are not limited to the field of manufacturing. Possible fields of applications may include education, customer service, automatic answering at government offices, and software operating instructions.

In the embodiments above, two types of attentions, that is, causality attention and similarity attention (representing similarity between words in contexts from general viewpoint) are used simultaneously. The present invention, however, is not limited to such embodiments. Depending on an application, different types of attentions may further be used. For example, attentions using the relations below, disclosed in JP2015-121896, may be used, as mentioned above. Further, in place of one of or both of the causality attention and the similarity attention, attention or attentions of these relations may be used.

material relation (example: <produce B from A> (corn, biofuel)),
necessity relation (example: <A is indispensable for B> (sunlight, photosynthesis)),
use relation (example: <use A for B> (iPS cells, regenerative medicine)) and
prevention relation (example: <prevent B by A> (vaccine, influenza)).

The attentions of such relations can be obtained in similar manner as the causality attention. The method described in JP2015-121896 mentioned above can be used as the method of obtaining expressions representing these relations. Specifically, semantic class information of words and a group of specific patterns (referred to as the seed patterns) which will be the source for extracting semantic relation patterns are stored in database. By extracting patterns similar to these seed patterns stored in the database from web archive storage unit 56, the database of semantic relation patterns is built. Expressions matching these semantic patterns are collected from the web archive, and mutual information of words in a set of collected expressions is calculated to generate an attention matrix of the relation. Further, words are similarly extracted from a question and answer passages and, from the attention matrix formed in advance, two matrices are generated in a similar manner, to provide weights to the words input to the neural network.

When matrix of causality attention is calculated by causality attention calculating unit 384 shown in FIG. 12, for example, mutual information at each normalization point was used. No matter which of the relations above is used, by focusing on specific sentence structure representing the relation and word positions having specific relation, it is possible to calculate a value comparable to the mutual information at each normalization point using a similar method as for calculating the mutual information. Therefore, matrix of the attention comparable to causality attention can be calculated.

When three or more attentions are used, mrCNN or mrCNNs similar to general mrCNN 182 and causality mrCNN 180 shown in FIG. 10 may be prepared for respective relations, and the number of inputs to classifiers 184 may be increased accordingly.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is usable to find a solution when a problem arises in a wide range of fields, whether it belongs to the manufacturing or service industry.

REFERENCE SIGNS LIST

Cp, Cq causality attention matrix
Sp, Sq similarity attention matrix
Xp, Xq word vector sequence
Ap, Aq feature vector
120 question
122 answer
124 why-question-answering system
126 question-answering system
128 existing question-answering system
150 question receiving unit
152 response receiving unit
154 answer passage storage unit
156 question/answer passage pair generating unit
158 determining unit
160 selecting unit
162 question/answer pair
164 general passage level representation
166 causality passage level representation
180 causality mrCNN
182 general mrCNN
184 classifier
210 general word vector converter
212,242 word vector sequence
214 general sentence level CNN
216, 362, 366 general sentence level semantic representation
218 general passage level CNN
240 causality word vector converter
244 causality sentence level CNN
246 causality sentence level semantic matrix
248 causality passage level CNN
260 web archive storage unit
262 causality extractor
264 causality expression storage unit
266 causality word vector training unit
270 general word vector training unit
280 sparse processing unit
282 word vector sequence
284 similarity attention processing unit
286 similarity attention matrix
288 causality attention processing unit 290 causality attention matrix
292 attention-based word vector calculator
294 word vector sequence
298 convolution/pooling unit
300 similarity attention calculating unit
302 similarity attention feature matrix
304 similarity attention matrix calculating unit
320 causality attention calculating unit
322 causality attention feature matrix
324 causality attention matrix calculating unit
340 feature vectors
360, 364 mrCNN
368 convolution/pooling unit
380, 400 similarity attention calculating unit
382, 386, 402, 406 attention matrix
384, 404 causality attention calculating unit
388, 408 updating unit

The invention claimed is:

1. A non-factoid question-answering device, receiving a pair of a question and an answer passage and determining whether or not the answer passage is a correct answer to the question, comprising:
a first word semantic vector converting means for converting the question and the answer passage to word semantic vector sequences in accordance with meanings from a certain viewpoint;
a first sentence level representation output means for weighting each word semantic vector to calculate and output sentence level representations of said question and said answer passage, in response to similarities of word semantic vectors between words in said question sentence and in said answer passage converted by said first word semantic vector converting means, and in response to a coefficient reflecting strength of a first prescribed relation between words;
a first passage level representation output means for calculating and outputting a passage level representation for each of said question and said answer passage, by executing for a prescribed number of times weighting of said sentence level representation, in response to similarity between said sentence level representation of said question and said sentence level representation of said answer passage output by said first sentence level representation output means, and in response to a coefficient reflecting strength of relation of vectors in said sentence level representations viewed in a context of said first prescribed relation; and
a determining means for determining whether or not said answer passage is a correct answer to said question, based on the similarity between said sentence level representations for each of said question and said answer passage output from said first sentence level representation output means, and based on the similarity between said passage level representations for each of said question and said answer passage output from said first passage level representation output means.

2. The non-factoid question-answering device according to claim 1, wherein
said first sentence level representation output means includes:
a similarity attention matrix calculating means for calculating, for combinations of each of word semantic vectors contained in said word semantic vector sequence of said question sentence and each of word semantic vectors contained in said word semantic vector sequence of said answer passage, similarity representing semantic similarity between each other, and for calculating a similarity attention matrix;
a first attention matrix calculating means for calculating, for the combinations of each of the words contained in said question sentence and each of the words contained in said answer passage, a measure representing frequency that the two words respectively appear at prescribed positions in a sentence in accordance with said first prescribed relation, and for calculating an attention matrix related to said first prescribed relation;
a word vector calculating means for performing, on the word semantic vector sequences contained in said word semantic word vector sequences of said question sentence and said word semantic vector sequences of said answer passage, an operation of adding weight of the similarity attention determined by said similarity attention matrix and the first attention determined by said first attention matrix and thereby for calculating each word vector; and
a CNN for performing sentence-by-sentence convolution and pooling on both of said word semantic sequence of said question sentence and said word semantic vector sequence of said answer passage calculated by said word vector calculating means, and thereby for outputting said first sentence level representation.

3. The non-factoid question-answering device according to claim 2, further comprising
a sparse processing means for making sparse each said word vector by updating any negative element of each said word vector to zero prior to calculation of said each word vector by said word vector calculating means.

4. The non-factoid question-answering device according to claim 1, further comprising:
a second word semantic vector converting means for converting the question and the answer passage to word semantic vector sequences respectively in accordance with meanings from another viewpoint different from said certain viewpoint;
a second sentence level representation output means for weighting each word semantic vector to calculate and output sentence level representations of said question and said answer passage, in response to similarities of word semantic vectors between words in said question sentence and in said answer passage converted by said second word semantic vector converting means, and in response to a coefficient reflecting strength of a second prescribed relation between words; and
a second passage level representation output means for calculating and outputting a passage level representation for each of said question and said answer passage, by executing for a prescribed number of times weighting of said sentence level representation, in response to similarity between said sentence level representation of said question and said sentence level representation of said answer passage output by said second sentence level representation output means, and in response to a coefficient reflecting strength of relation of vectors in said sentence level representations viewed in a context of said second prescribed relation; wherein
said determining means includes means for determining whether or not said answer passage is a correct answer to said question, based on the similarity between said sentence level representations for each of said question and said answer passage output from said first and second sentence level representation output means, and based on the similarity between said passage level representations for each of said question and said answer passage output from said first and second passage level representation output means.

5. The non-factoid question-answering device according to claim 4, wherein said second prescribed relation is the same as said first prescribed relation.

6. The non-factoid question-answering device according to claim 1, wherein said first relation is causality.

* * * * *